Oct. 6, 1959   H. C. ELLIS   2,907,464
CENTRIFUGAL EXTRACTOR
Filed Aug. 24, 1955   6 Sheets-Sheet 1

INVENTOR:
HUBERT C. ELLIS
BY *Smith, Alsen, Baird & Miller*, ATT'YS

Oct. 6, 1959 H. C. ELLIS 2,907,464
CENTRIFUGAL EXTRACTOR
Filed Aug. 24, 1955 6 Sheets-Sheet 2
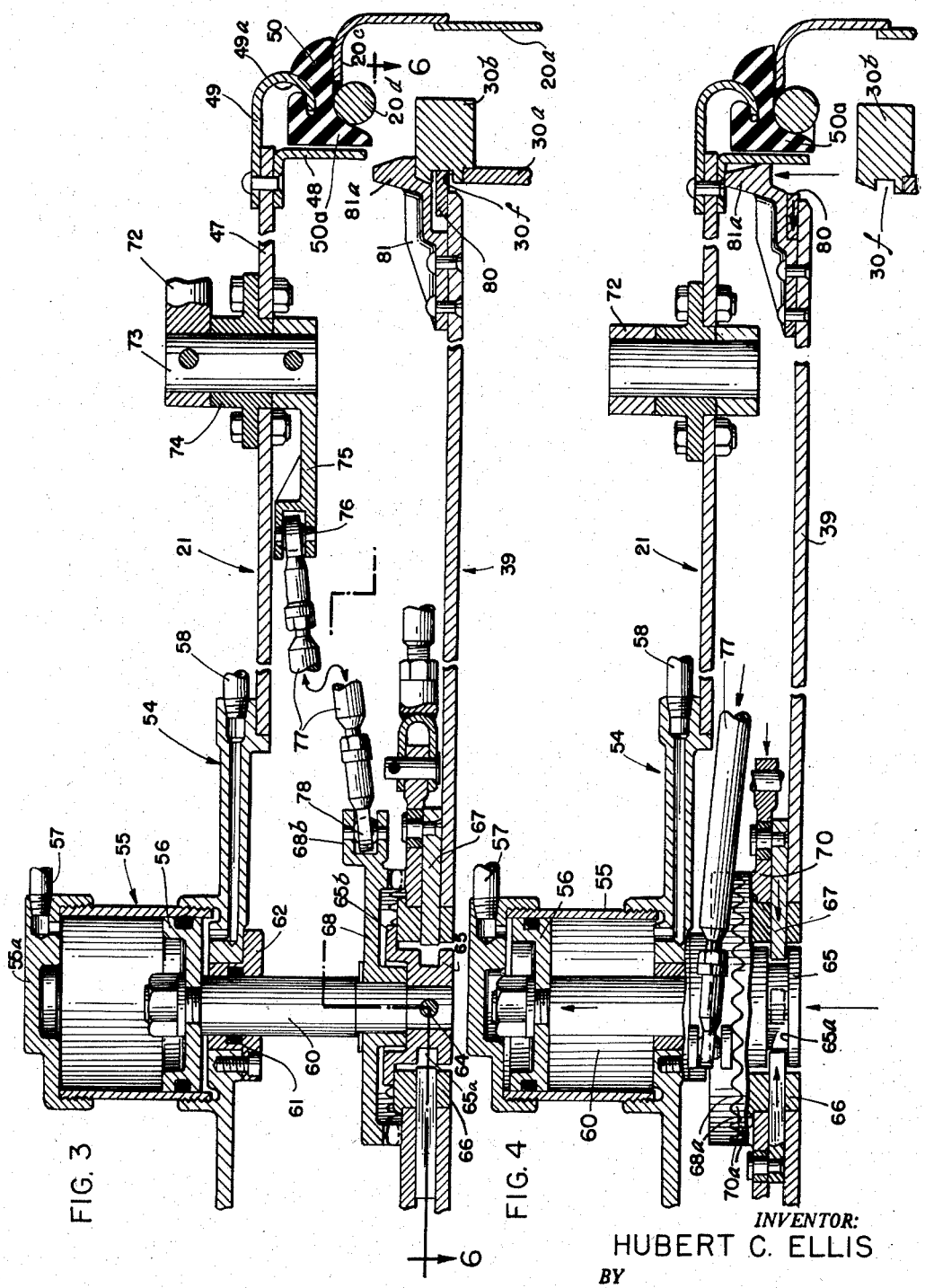
INVENTOR:
HUBERT C. ELLIS
BY
ATT'YS

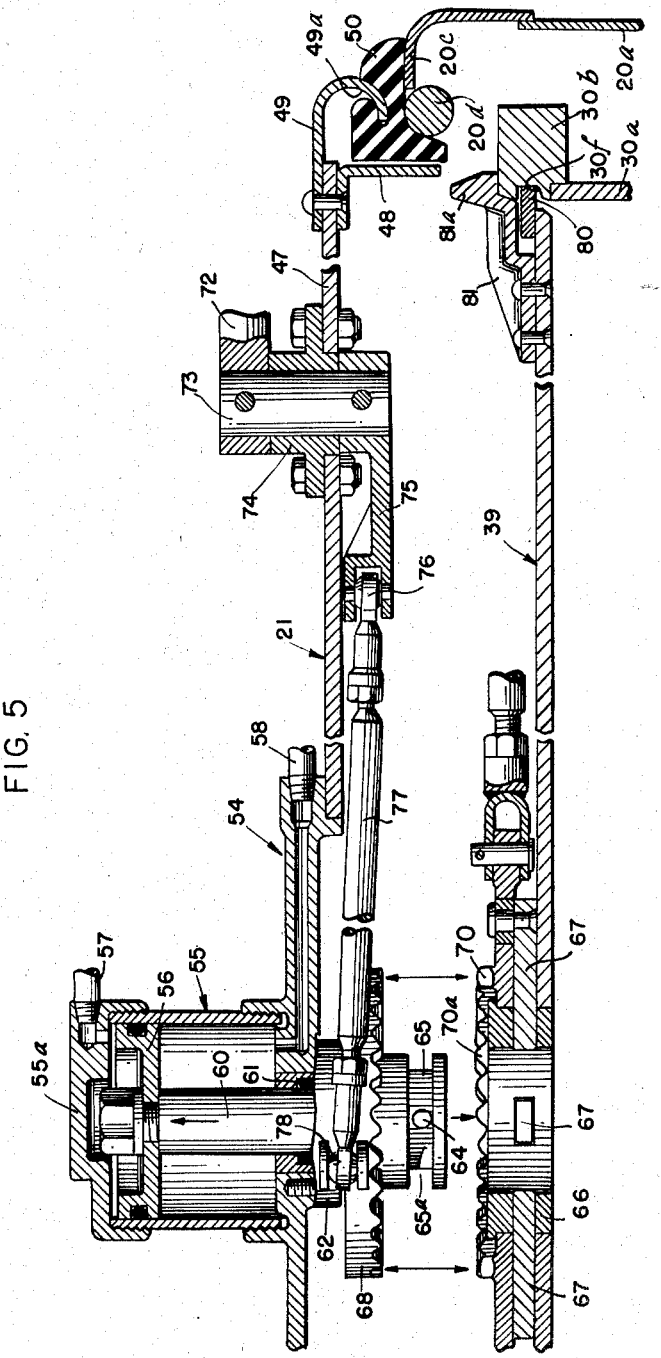

Oct. 6, 1959 — H. C. ELLIS — 2,907,464
CENTRIFUGAL EXTRACTOR
Filed Aug. 24, 1955 — 6 Sheets-Sheet 4
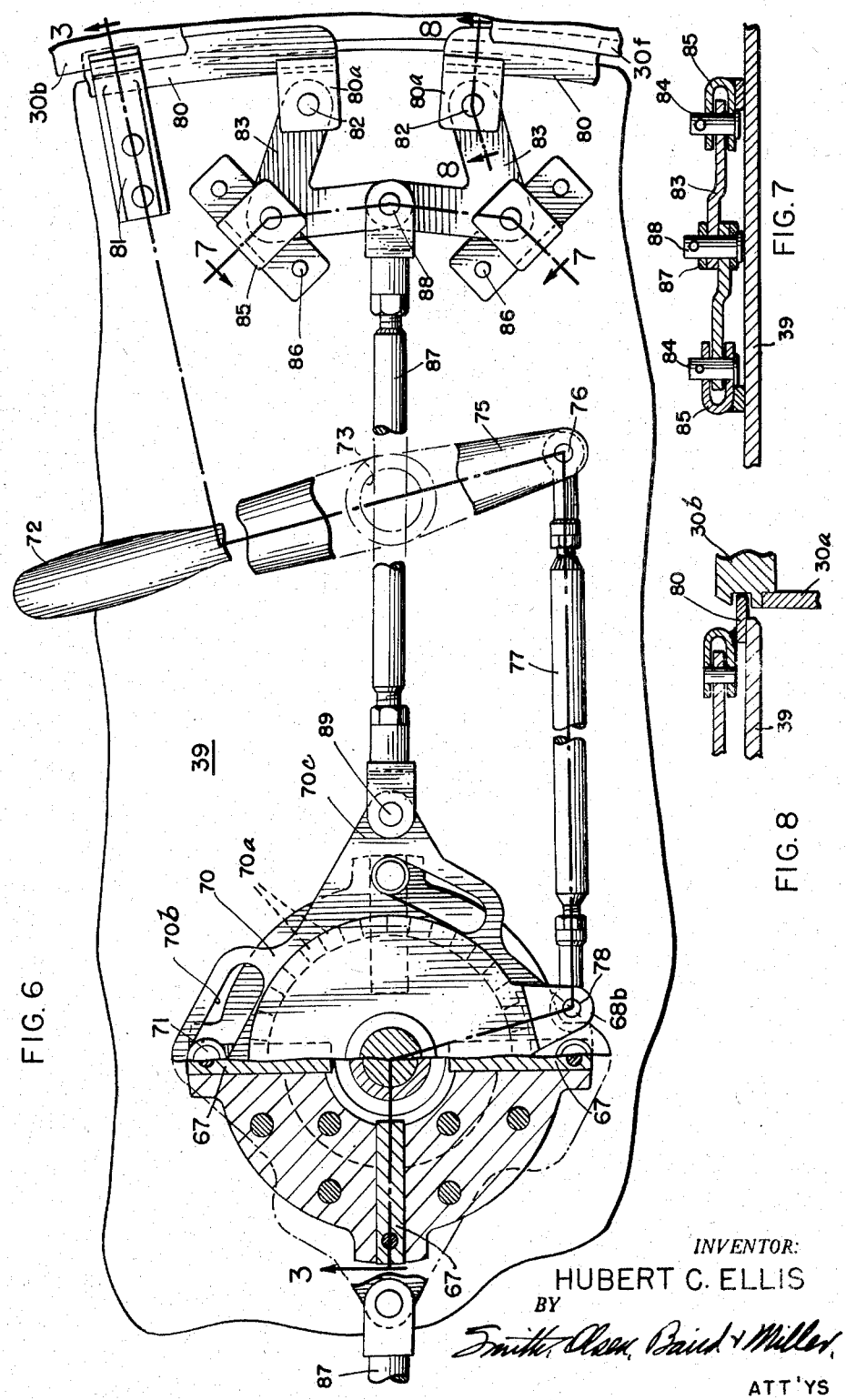
INVENTOR:
HUBERT C. ELLIS
BY
Smith, Olsen, Baird + Miller
ATT'YS Oct. 6, 1959 — H. C. ELLIS — 2,907,464
CENTRIFUGAL EXTRACTOR
Filed Aug. 24, 1955 — 6 Sheets-Sheet 5

INVENTOR:
HUBERT C. ELLIS
BY
ATT'YS

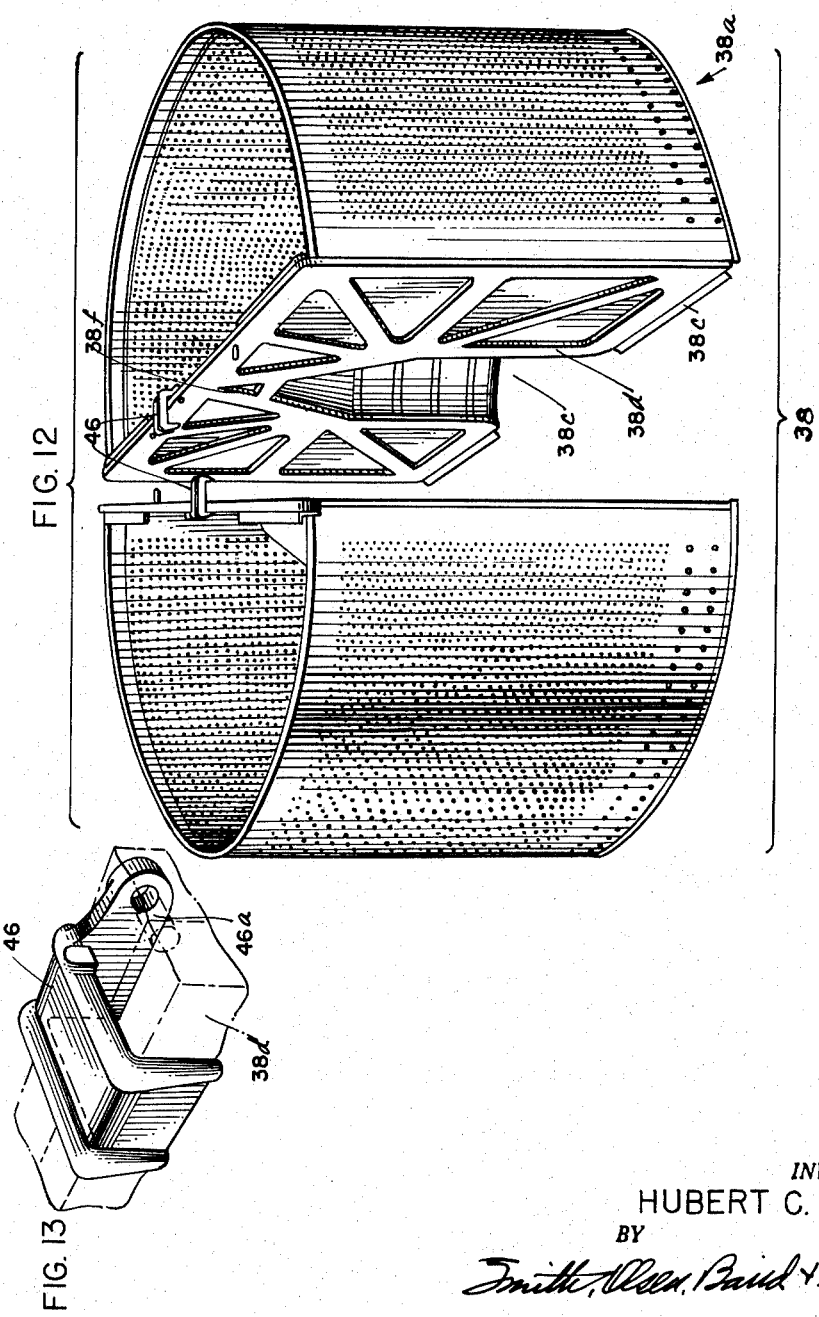

United States Patent Office 2,907,464
Patented Oct. 6, 1959

2,907,464

CENTRIFUGAL EXTRACTOR

Hubert C. Ellis, Evanston, Ill.

Application August 24, 1955, Serial No. 530,279

14 Claims. (Cl. 210—360)

This invention relates to centrifugal moisture extractors for wet clothes and the present improvements are particularly adapted for use in the vertical type of extractor shown in applicant's United States Letters Patent No. 2,521,054, dated September 5, 1950, and in Letters Patent No. 2,534,286, granted December 19, 1950, to Alphonse G. Maitzen.

The improvements may preferably be embodied in a machine comprising an outer shell or casing open at its upper end, a rotary basket adapted to revolve at high speed about a vertical axis within the casing and provided with a perforated annular wall, a cover for the casing which constitutes an outer cover for the extractor as a whole, and a separate curb or cover for the basket. When the extractor is of the "unloading" type there is also a separate perforated clothes container which is placed in the rotary basket and unloaded therefrom while containing the clothes. This container may preferably be of the split type, as shown in said Maitzen Letters Patent, and is placed in and removed from the basket by means of a hoist or crane. The curb or cover for the basket is secured thereto and rotates at high speed with the basket. At the conclusion of a drying operation, it has heretofore been necessary to open the outer cover (which has been done by power) and then to lift off the cover for the basket preliminary to removing the clothes, either directly or by the removal of the clothes container. This has been a cumbersome and time-consuming procedure.

It is, therefore, the principal object of the present invention to provide a centrifugal extractor of the type referred to, comprising a combination outer cover and an inner cover or curb which may be opened or closed together by power operated means. A further object is to provide a combination outer cover and curb arranged to be opened and closed in unison with means for detaching the curb from the cover and locking it to the basket so that the curb may rotate with the basket independently of the stationary cover which will then be in its closed position. Another object of the invention is to provide a centrifugal extractor comprising a casing, and a basket, a cover for the casing, a curb for the basket, means for rotating the basket, means for elevating the cover, one locking means for securing the curb to the cover, a second locking means for securing the curb to the basket, and means for operating said locking means to effect the simultaneous locking of the curb to the cover and the release of the curb from the basket or vice versa. Still another object of the invention is to provide a casing having a rotary basket mounted therein, a cover for the casing, a curb for the basket adapted to rotate therewith, means for rotating the basket, means for opening and closing the cover, means for latching the curb to the cover, means for moving the curb toward and from the cover, means for causing the curb to be latched to the cover when it is unlatched from the basket and to be latched to the basket when it is unlatched from the cover, and means for causing a proper sequence and timed relation of the operation of the said parts of the machine. Other objects relate to various features of construction and arrangement which will appear more fully hereinafter.

The nature of the invention will be understood from the following specification taken with the accompanying drawings in which one embodiment is illustrated. In the drawings, Figure 1 shows a top plan view of a centrifugal extractor embodying the features of the present invention;

Fig. 3 shows an enlarged partial radial section through the cover and the curb of the machine shown in Figs. 1 and 2, taken on the irregular line 3—3 of Fig. 6, illustrating the curb lowered away from and unlatched from the cover but latched to the top portion of the basket;

Fig. 4 is a view similar to that of Fig. 3, showing the relative positions of the parts when the curb is unlatched from the basket but latched to the cover and raised toward the cover, whereby the curb and cover may be swung together toward and from closed positions;

Fig. 5 is a sectional view similar to those of Figs. 3 and 4, showing the curb latched to the basket to rotate therewith, but with the clutch member for securing the curb to the cover in its elevated position so that the basket and curb may rotate freely independently of the cover;

Fig. 6 shows a horizontal section taken on the line 6—6 of Fig. 3;

Fig. 7 is a sectional view taken on the line 7—7 of Fig. 6;

Fig. 8 is a sectional view taken on the line 8—8 of Fig. 6;

Fig. 12 is a perspective view of the split container for the clothes, which is adapted to be moved into and out of the basket by a hoist or the like; and Fig. 13 shows by dotted lines an enlarged vertical section through the upper portions of the split container shown in Fig. 12, illustrating a perspective view of one of the devices for clamping the two sections of the container together for movement to and from the basket.

Figure 1:
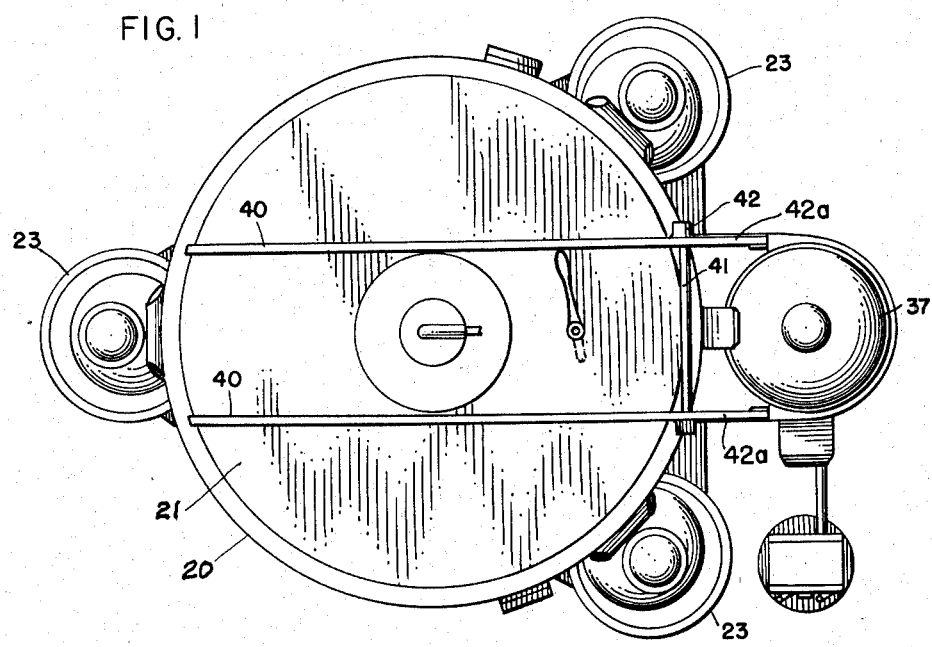
Figure 2:
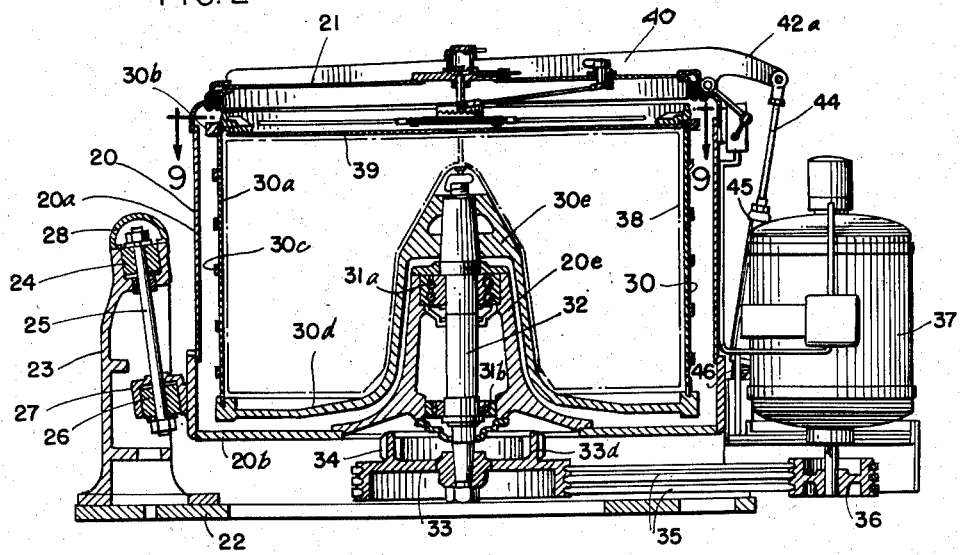
Fig. 2 shows a vertical axial section through the extractor shown in Fig. 1, with the driving motor and associated parts in elevation.
Figure 9:
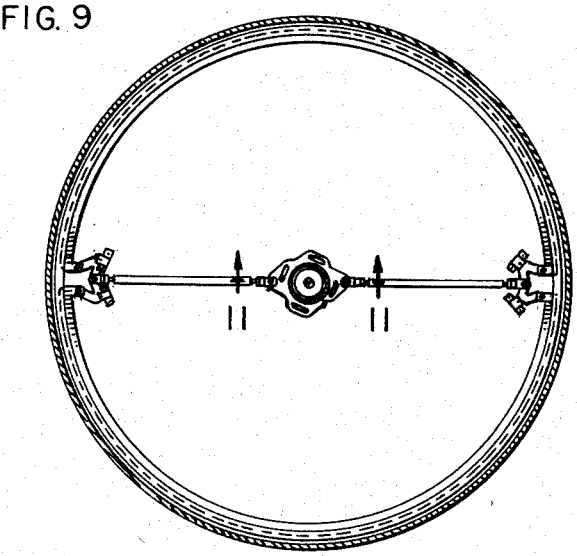
Fig. 9 shows a horizontal section taken on the line 9—9 of Fig. 2, illustrating the means, including semicircular latch members, for latching the curb to the basket.

Referring to Figs. 1 and 2 of the drawings, the invention is shown as embodied in an extractor of the upright type comprising an outer casing 20 in the form of an upright circular vessel, open at its top and adapted to be closed, when the machine is in operation, by a cover 21. The casing 20 is adapted to collect the water or the like which is removed from the clothes during the extracting process and it comprises an annular wall 20a united with the upturned annular flange of a base portion 20b. The vessel 20 is supported upon a base plate 22, or other support, by three pedestals 23 which are secured to the base plate to extend upwardly therefrom at equally spaced intervals around its outer periphery. Each pedestal is provided at its upper end with a socket in which is mounted a buffer block 24. Each block has adjustably secured therein a suspension rod 25 which engages another buffer block 26 of rubber or the like which is secured in a socket member 27 secured to the base 20b of the vessel. In this way the casing is suspended somewhat resiliently from its supports and may sustain such lateral vibration as may be set up in the operation of the machine. The effective lengths of the rods 25 may be regulated by adjusting the nuts on their ends in order to level the casing 20 so that its axis will be vertical. A removable cap 28 is mounted over the upper end of each pedestal.

Within the casing 20 is mounted the rotary basket 30 in which are contained, either directly or by means of a separate container, the clothes from which the moisture is to be extracted. The basket 30 comprises an annular wall 30a which is perforated substantially throughout its area and reinforced around its top by an annular rim 30b. The wall 30a is also reinforced between its upper and lower edges by a series of spaced annular metal bands 30c. The basket 30 also comprises base 30d having an enlarged outer edge, in which the annular wall 30a is secured, and a substantially cone-shaped, upwardly extending central portion 30e which forms the hub of the basket. The portion 30e of the basket fits loosely around a hollow upward extension 20e of the casing. The casing extension 20e has secured therein an upper ball bearing unit 31a and a lower ball bearing unit 31b which support and provide journals for the vertical shaft or spindle 32 by which the basket is supported and rotated in spaced relation to the casing. For this purpose the upper end of the shaft is tapered and secured in a socket formed in the upper end of the hub portion 30e of the basket.

The lower end of the shaft 32 is secured to a pulley 33 having a brake flange 33a engaged by a brake strap 34 which may be adjusted to control the rotation of the basket. The pulley has a series of annular grooves which are engaged by a plurality of driving belts 35 which are driven by a grooved pulley 36 mounted upon the vertical shaft of an electric motor 37 by which the basket is rotated. The basket 30 may preferably contain the removable split perforated container 38, shown particularly in Fig. 12, and it is adapted to be closed by a curb or cover 39 which, in accordance with the present invention, is arranged to be opened and closed in unison with the corresponding movements of the casing cover 21. This cover is in the form of a flat circular plate having secured to the upper or outer side thereof a pair of parallel bars 40 which extend transversely of the casing and are pivotally mounted thereon by means of a shaft 41 journalled in brackets 42 secured to the casing. The bars have outwardly projecting arms 42a which are pivotally connected to the upper ends of piston rods 44; these rods extend into cylinders 45 which are pivoted at their lower ends on brackets 46 carried by the casing 20. The pistons on these rods may be actuated by compressed air admitted to the upper or lower ends, respectively, of the cylinders 45 to cause the opening and closing of the covers 21 and 39.

The split container 38 comprises two semi-circular sections 38a (Fig. 12) each comprising a semi-circular outer wall 38b, perforated throughout most of its area, a connected bottom wall 38c and a transverse wall 38d made up of a rigid frame and an inner lining which is provided with a central concaved recess 38e adapted to fit over the hub portion 30e of the basket. The two sections 38a are adapted to be secured together by clamps 46 pivoted by pins 46a on the tops of the transverse walls 38d and adapted to be swung downwardly to embrace these walls so that the two sections are held together and may be moved as a unit by a hoist which may be maneuvered so that its lifting hook will engage registering apertures 38f in the upper parts of the transverse walls 38. It has heretofore been the practice to provide each section of such a split container with a cover having a sliding interlocking engagement with the upper edges of its walls but when the container 38 is used with the casing cover and basket curb of the present invention a separate cover for the split container is not necessary.

Referring now to a more specific description of the covers 21 and 39 and the means for operating them, and particularly to the construction shown in Figs. 3 to 8, inclusive, the cover 21 comprises a circular plate 47 having secured to its outer edge an angle bar 48, located on its inner side, and an annular plate 49, located on its outer side, which secure between them an annular rubber sealing ring 50 adapted to seat upon the upper inturned edge 20c of the vessel 20. The plate 49 has a downwardly and inwardly curled outer edge 49a which hooks into an undercut groove in the upper side of the ring 50 and the ring 50 has a depending flange 50a adapted to extend downwardly on the inner side of the rod 20d which is welded to the inturned edge of the annular wall 20a and forms the boundary of the top opening of the casing. In this way a tight joint is established between the vessel 20 and the cover 21 when the cover is closed.

To provide for relative movement of the doors 21 and 39 toward and from each other, to facilitate their unitary operation, the cover 21 is provided with a central opening in which there is mounted a plate 54 carrying a cylinder 55 containing a piston 56 adapted to be reciprocated by compressed air. The lower end of the cylinder chamber is formed by the plate 54 and the upper end is closed by the cylinder head 55a which has a passage therethrough communicating with a tube 57 through which compressed air may be admitted to effect a downward movement of the piston. The plate 54 has a passage leading therethrough to the lower end of the cylinder and connected to another tube 58 adapted to be connected to the compressed air supply to effect an upward movement of the piston 56.

The piston 56 is secured to the upper end of a combined piston rod and shaft 60 which reciprocates through an aperture in the plate 54 with which it has a fluid tight connection by means of the packing 61 and packing gland 62. The lower or inner end of the piston or shaft 60 has secured thereon by a pin 64 a clutch member 65 adapted to extend loosely into the aperture of a clutch ring 66 carried by the curb or cover 39. The clutch member 65 has an annular groove 65a adapted to be engaged by series of radially movable clutch pins or latch members 67 which are slidably mounted in slots formed in the member 66. The clutch member 65 also has an outwardly extending annular flange 65b which is adapted to overhang the clutch ring 66 to limit the downward movement of the piston 56 and to locate the groove 65a in registry with the pins 67, so that these pins may be moved inwardly to latch the curb or cover 39 to the shaft 60, whereby compressed air may be admitted to the lower part of the cylinder 54 to cause the cover 39 and parts carried thereby to move upwardly from the position shown in Fig. 3 to the position shown in Fig. 4.

There is also rotatably mounted on the shaft or piston rod 60, above the member 65, a clutch plate 68 having on its under or inner side, an annular series of clutch teeth 68a adapted to mesh with an annular series of clutch teeth 70a formed on a clutch actuating member 70 mounted for angular movement on the cover 39 about the clutch ring 66. When the clutch teeth 68a and 70a are in engagement, the turning of the clutch actuating member 70 by the clutch plate 68 will cause the clutch pins 67 to move radially due to the action of inclined cam slots 70b, formed in the member 70, which are engaged by rollers 71 mounted on the outer portions of the clutch pins. Thus, by rotating the clutch plate 68 about the piston rod 60, the inner curb or cover 39 may be released from or connected to the piston rod 60 to permit relative axial movement of the covers.

The rotation of the clutch plate 68 is effected manually by a hand lever 72, located on the outside of the cover 21, which is fixed on a short shaft 73 journalled in a bearing member 74 secured in an aperture in the cover. On the inside of the cover the shaft 73 is secured to a crank arm 75 adapted to swing parallel to the cover. The crank arm 75 has a ball and socket pivotal connection 76 with a rod 77 made up of parts which are relatively adjustable to permit the effective length of the rod to be varied. The other end of the rod 77 has a ball and socket pivotal connection 78 with a pair of ears 68b projecting radially from the outer margin of the clutch plate 68. The pivotal connections 76 and 78 permit the lever 72 to be operated to rotate the clutch plate 68 either to the position shown in Fig. 3 or to that shown in Fig. 4.

The rotation of the actuating member 70 operates not only to engage and disengage the clutch pins 67 but also to operate the latches by which the cover 39 is secured to the marginal rim 30b of the basket 30. For this purpose the rim 30b is provided on its inner side with an annular groove 30f adapted to be engaged by two arcuate latch members 80 each of which extends throughout substantially one-half of the circumference of the cover 39. The members 80 are located at the margin of the cover and are mounted for sliding radial movement on the cover beneath supporting brackets 81 which are secured by rivets to the cover and which rest on the rim 30b to support the cover when the cover is in closed position. Each arcuate latch member 80 has a short arm 80a extending radially inward at each end thereof. These arms are pivotally connected at 82 to the outer arms of bell crank levers 83 which are pivotally mounted by pins 84 in brackets 85, secured by rivets 86 to the cover. The inner arms of the bell crank levers 83 which are connected to adjacent ends of the two latch members 80 are pivotally connected to each other and to an actuating rod 87 by a common pin 88. This rod comprises parts which are relatively adjustable lengthwise and the inner end of the rod is pivotally connected by a pin 89 to a radial arm 70c of the actuating member 70. The adjacent ends of the arcuate latch members 80 are connected in the same manner at opposite sides of the cover. Thus, there are two actuating rods 87 connected to opposite pairs of ends of the latch members and to arms 70c which are located on diametrically opposite sides of the member 70.

When the actuating member 70 is rotated by the clutch plate to move the clutch pins 67 into engagement with the groove 65a of the clutch member 65, the actuating member operates at the same time through the rods 87 to withdraw the latch members 80 from their interlocking engagement with the groove 30c of the basket. Compressed air may then be admitted through the tube 58 to the lower end of the cylinder 55 to elevate the cover 39 from the position shown in Fig. 3 to the position shown in Fig. 4. When this occurs, V-shaped projections 81a on the brackets 81 are adapted to wedge into engagement with the inner face of the depending angle bar 48 on the cover 21, so that the inner cover 39 may be largely held by friction in its upper position independently of the air pressure in the cylinder and the two covers are held firmly together so that they will move in unison without relative movement. When the covers are so connected, compressed air may be admitted to the cylinders 45 to cause the covers to swing together to their open positions.

With the covers open, clothes to be dried may be placed directly in the basket 30 or the split container 38, shown in Fig. 12, may be lowered by a hoist into the basket with the clothes contained in its separate compartments. Compressed air is then admitted to the other ends of the cylinders 45 to cause the covers 21 and 39 to be moved to their closed positions. Thereupon, compressed air is admitted to the upper end of the cylinder 55 to cause the piston 56 to push the cover 39 downwardly to its lower position with the brackets 81 resting on the rim of the basket 30. The operator then actuates the lever 72 to rotate the clutch member 68 and thereby turn the actuating member 70 to cause the clutch pins 67 to be retracted from the clutch member 65 and to cause the latch members 80 to engage the groove 30f in the rim of the basket. The operator then admits compressed air again to the lower end of the cylinder 55 to cause the elevation of the clutch member 68 and the clutch member 65 to their upper positions, as shown in Fig. 5, thus leaving the basket 30 and the cover 39 free for high speed rotation which is then effected by operating the electric driving motor 37. It will be observed that during this high speed rotation of the basket 30, the centrifugal forces exerted upon the two arcuate latch members 80 will insure that they do not become disengaged from the annular groove 30f in rim 30b of the basket 30, this being a safety feature inherent in the present structure. When the moisture has been extracted from the clothes, the motor is stopped and air is again admitted through the tube 57 to the upper end of the cylinder 55 to cause the clutch members 68 and 65 to be lowered to the position shown in Fig. 3. The hand lever 72 is then operated to rotate the members 68 and 70 to cause the withdrawal of the clutch members 80 to release the cover 39 from the basket and simultaneously to cause the pins 67 to engage the clutch member 65. Compressed air is then admitted from the tube 58 to the lower end of the cylinder 55 to elevate the piston 56 and the cover 39 to the positions shown in Fig. 4. The covers 21 and 39 may then be swung to their open positions to permit removal of the clothes from the basket.

Figure 10:
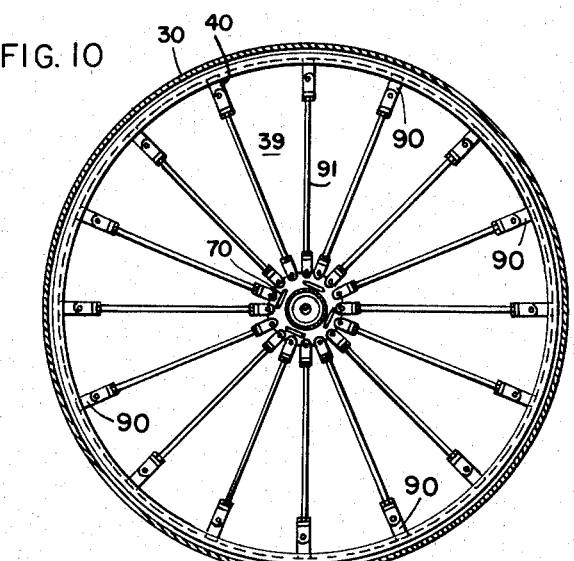
Fig. 10 is a sectional view similar to that of Fig. 9, showing a modified form of latching means for securing the curb to the basket.
Figure 11:
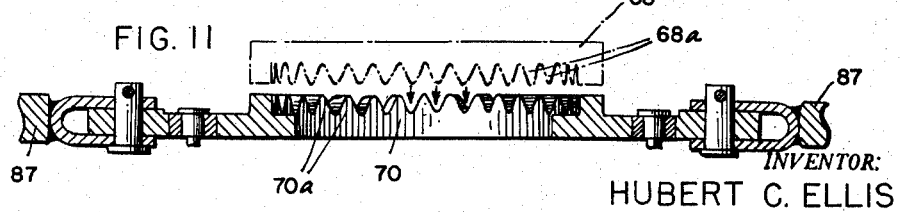
Fig. 11 is an enlarged vertical section taken on the line 11—11 of Fig. 9.

In Fig. 10, there is illustrated a modified form of latch mechanism for securing the cover 39 to the basket 30. In this construction, a plurality of latch members 90 are slidably mounted for radial movement on the cover 39 to engage the groove in the rim 30a of the basket. These members are distributed evenly throughout the periphery of the cover and are individually actuated by radially extending rods 91 which are pivoted to the latch members and to the previously described actuating member 70 so that, upon rotation of the member 70 the rods 91 are operated to engage or disengage the latch members 90.

Although one form of the invention, and a modification of a portion thereof, have been shown and described by way of illustration, it will be understood that the invention may take various other forms without departing from the scope of the appended claims.

I claim:

1. The combination in a centrifugal extractor, of a casing, a cover for said casing, a rotary basket mounted in said casing, means for rotating said basket, a cover for said basket, latching means having a first position for locking said last named cover to said basket and a second position for locking said last named cover to said first named cover, and means for selectively actuating said latching means from one of its said positions to the other.

2. The combination in a centrifugal extractor, of a casing, a cover for said casing, a rotary basket mounted in said casing, means for rotating said basket, a cover for said basket, latching means having a first position for locking said last named cover to said basket and a second position for locking said last named cover to said first named cover, means for selectively actuating said latching means from one of its said positions to the other, and means for opening said first named cover when said second named cover is locked thereto.

3. The combination in a centrifugal extractor, of a casing, a cover for said casing, means for opening and closing said cover, a rotary basket mounted in said casing, a cover for said basket, means for detachably latching said second named cover to said basket to rotate with said basket, means for rotating said basket, and means for locking said second named cover to said first named cover only when it is not latched to said basket.

4. The combination in a centrifugal extractor, of a casing, a cover for said casing, means for opening and closing said cover, a rotary basket in said casing, means for rotating said basket, a cover for said basket, latching means for securing said second named cover to said first named cover, a second latching means for securing said second named cover to said basket, and means for selectively disengaging either latching means and simultaneously rendering the other latching means operative.

5. The combination in a centrifugal extractor, of an upright casing, a cover for said casing, a rotary basket mounted in said casing, a cover for said basket beneath said first named cover, means for detachably locking said covers together, and power actuated means for effecting movement of said cover for said basket toward and from said cover for said casing when the latter one of said covers is in its closed position.

6. The combination in a centrifugal extractor, of a casing, a cover for said casing, a rotary basket mounted in said casing, a cover for said basket beneath said first named cover, means for locking said covers together, means for effecting movement of said cover for said basket toward and from said cover for said casing when the latter one of said covers is in its closed position, and means operative only when said covers are not locked together for locking said second named cover to said basket.

7. The combination in a centrifugal extractor, of a casing, a cover for said casing, a rotary basket mounted in said casing, a cover for said basket beneath said first named cover, means for locking said covers together, means for effecting movement of said cover for said basket toward and from said cover for said casing when the latter one of said covers is in its closed position, means operative only when said covers are not locked together for locking said second named cover to said basket, and means for rotating said basket when said second named cover is locked to said basket.

8. The combination in a centrifugal extractor, of a casing, a cover for a casing, a rotary basket mounted in said casing, a cover for said basket beneath said first named cover, means carried by said second cover for detachably latching said second cover to said first named cover and for alternately detachably latching said second named cover to said basket, and means carried by said first named cover for controlling the operation of said last named means.

9. The combination in a centrifugal extractor, of a casing, a cover for a casing, a rotary basket mounted in said casing, a cover for said basket beneath said first named cover, means carried by said second cover for latching said second cover to said first named cover and for latching said second named cover to said basket, an actuating member for effecting the operation of said latching means, an operating lever carried by said first named cover, a rotary clutch member actuated by said lever, a second clutch member carried by said actuating member and adapted to be engaged by said first named clutch member, and means for effecting relative movement of said clutch members.

10. The combination in a centrifugal extractor, of a casing, a cover for a casing, a rotary basket mounted in said casing, a cover for said basket beneath said first named cover, means carried by said second cover for latching said second cover to said first named cover and for latching said second named cover to said basket, an actuating member for effecting the operation of said latching means, an operating lever carried by said first named cover, a rotary clutch member actuated by said lever, a second clutch member carried by said actuating member and adapted to be engaged by said first named clutch member, and fluid pressure operated means carried by said first named cover for effecting relative movement of said clutch members.

11. The combination in a centrifugal extractor, of a casing, a rotary basket mounted in said casing and having an annular rim around its upper edge, a cover for said basket, a plurality of locking members carried by said cover and adapted to interlock with said rim, a cover for said casing, and means mounted on the outside of said last named cover for simultaneously actuating said locking members.

12. The combination in a centrifugal extractor, of a casing, a rotary basket mounted in said casing and having an annular rim provided on its inner side with an annular groove, a cover for said basket, substantially semi-circular latch members mounted on said cover and adapted to move outwardly into said groove, a cover for said casing mounted outside of said first named cover, and means mounted on said second named cover for controlling the operation of said latch members.

13. The combination in a centrifugal extractor, of a casing, a cover for said casing, a rotary basket mounted in said casing, a cover for said basket located inside of said first named cover, a cylinder carried by said first named cover, a piston in said cylinder, a piston rod actuated by said piston, and means for detachably locking said piston rod to said second named cover.

14. The combination in a centrifugal extractor, of a casing, a cover for said casing, a rotary basket mounted in said casing, a cover for said basket located inside of said first named cover, a cylinder carried by said first named cover, a piston in said cylinder, a piston rod actuated by said piston, means for detachably locking said piston rod to said second named cover, and means for latching said second named cover to said basket.

References Cited in the file of this patent

UNITED STATES PATENTS

| Re. 18,036 | Nelson | Apr. 7, 1931 |
| Re. 23,727 | Miller | Oct. 27, 1953 |
| 1,000,491 | Busby et al. | Aug. 15, 1911 |
| 1,314,708 | Schwarz et al. | Sept. 2, 1919 |
| 1,559,346 | Moore | Oct. 27, 1925 |
| 1,705,361 | Graydon | Mar. 12, 1929 |
| 1,939,139 | Schott | Dec. 12, 1933 |
| 1,995,926 | Kirby | Mar. 26, 1935 |
| 2,099,863 | Miller | Nov. 23, 1937 |
| 2,138,334 | Becquet | Nov. 29, 1938 |
| 2,519,814 | Bayless | Aug. 22, 1950 |
| 2,521,054 | Ellis | Sept. 5, 1950 |
| 2,534,286 | Maitzen | Dec. 19, 1950 |
| 2,575,039 | Barnes | Nov. 13, 1951 |

FOREIGN PATENTS

| 498,789 | Germany | May 27, 1930 |
| 544,081 | Germany | Feb. 13, 1932 |